Oct. 14, 1969          L. C. PROFENNA          3,472,005
           ARTICULARLY MOUNTED GANG MOWERS ON A TRACTOR
Filed Nov. 21, 1966                              5 Sheets-Sheet 1
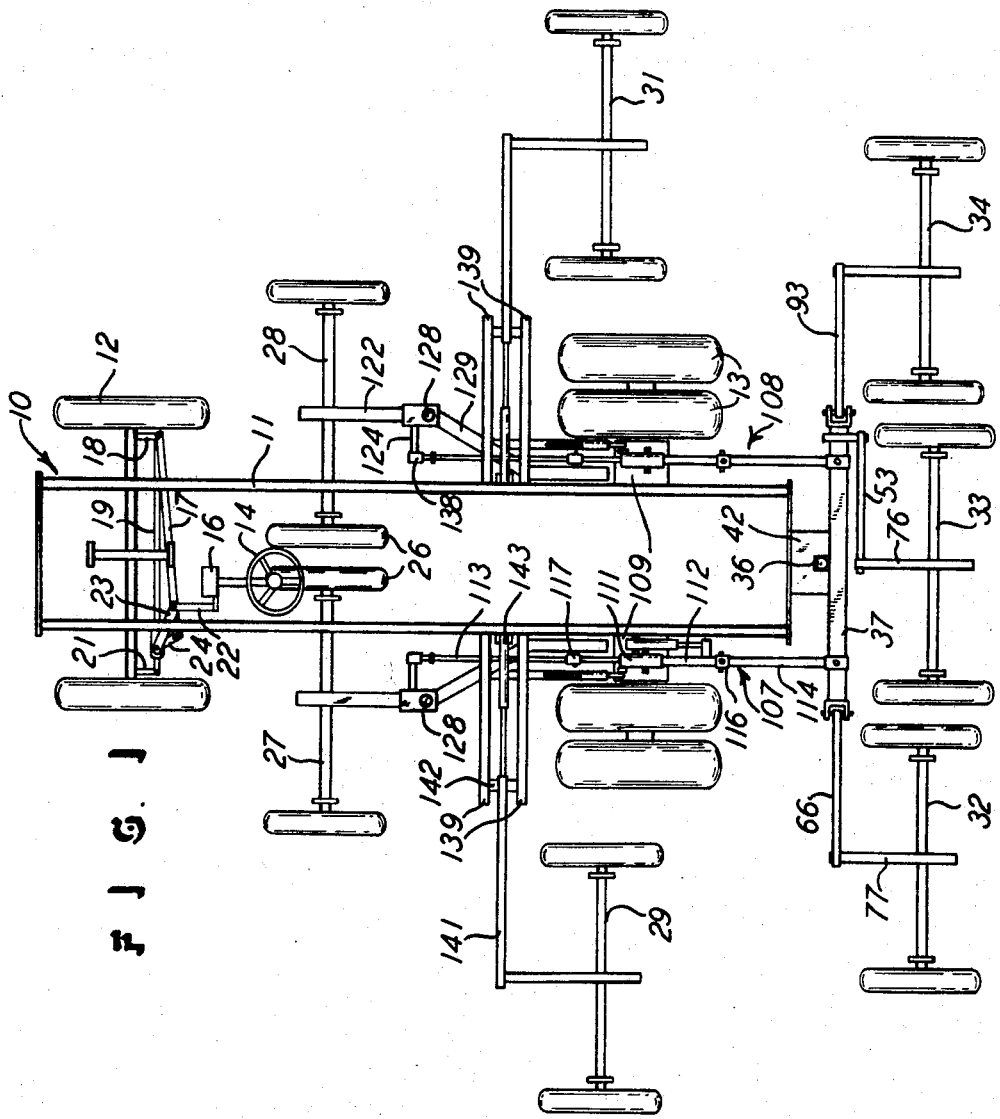
Inventor:
LEONARDO C. PROFENNA
By: Arthur J. Hansmann,
           Attorney

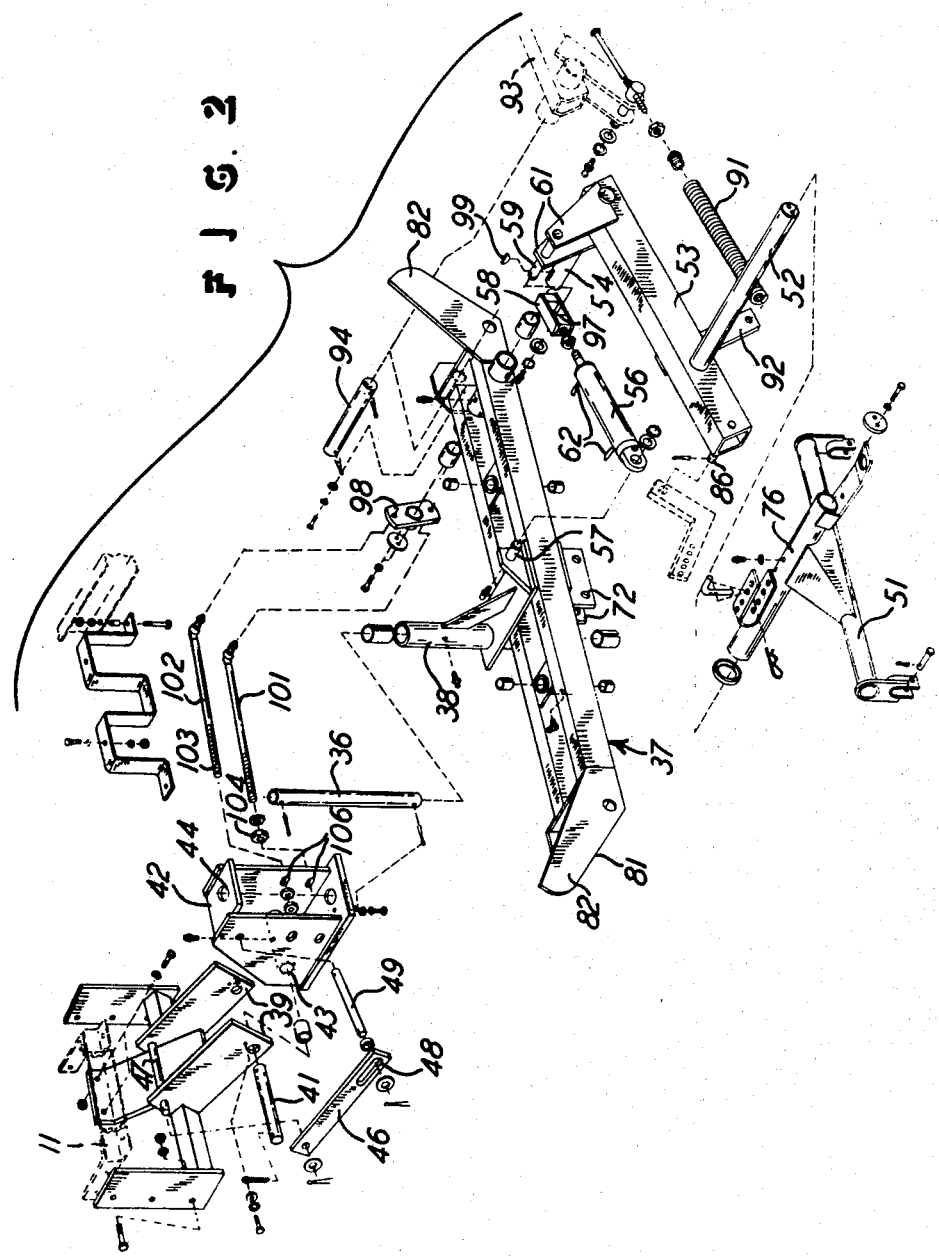

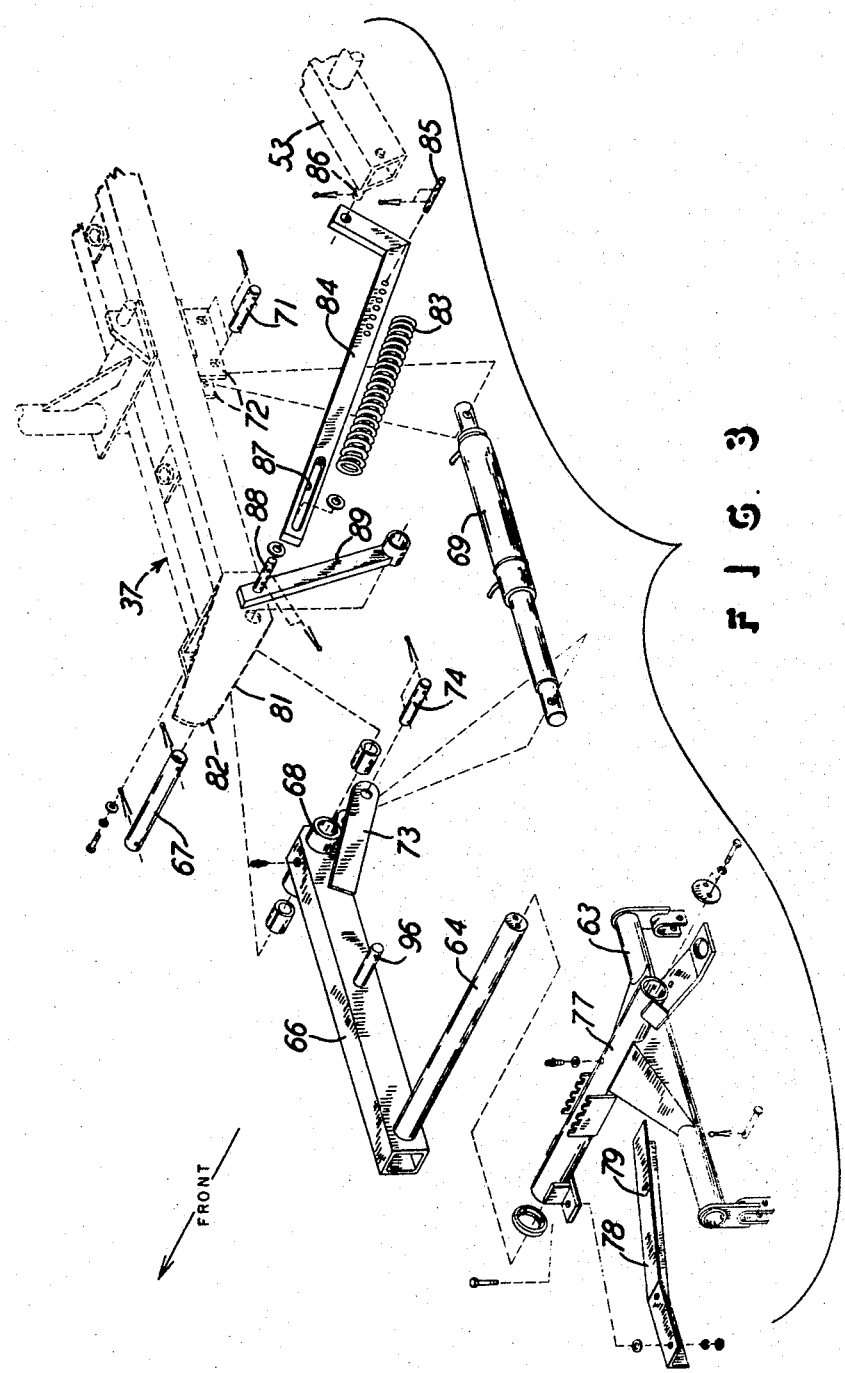

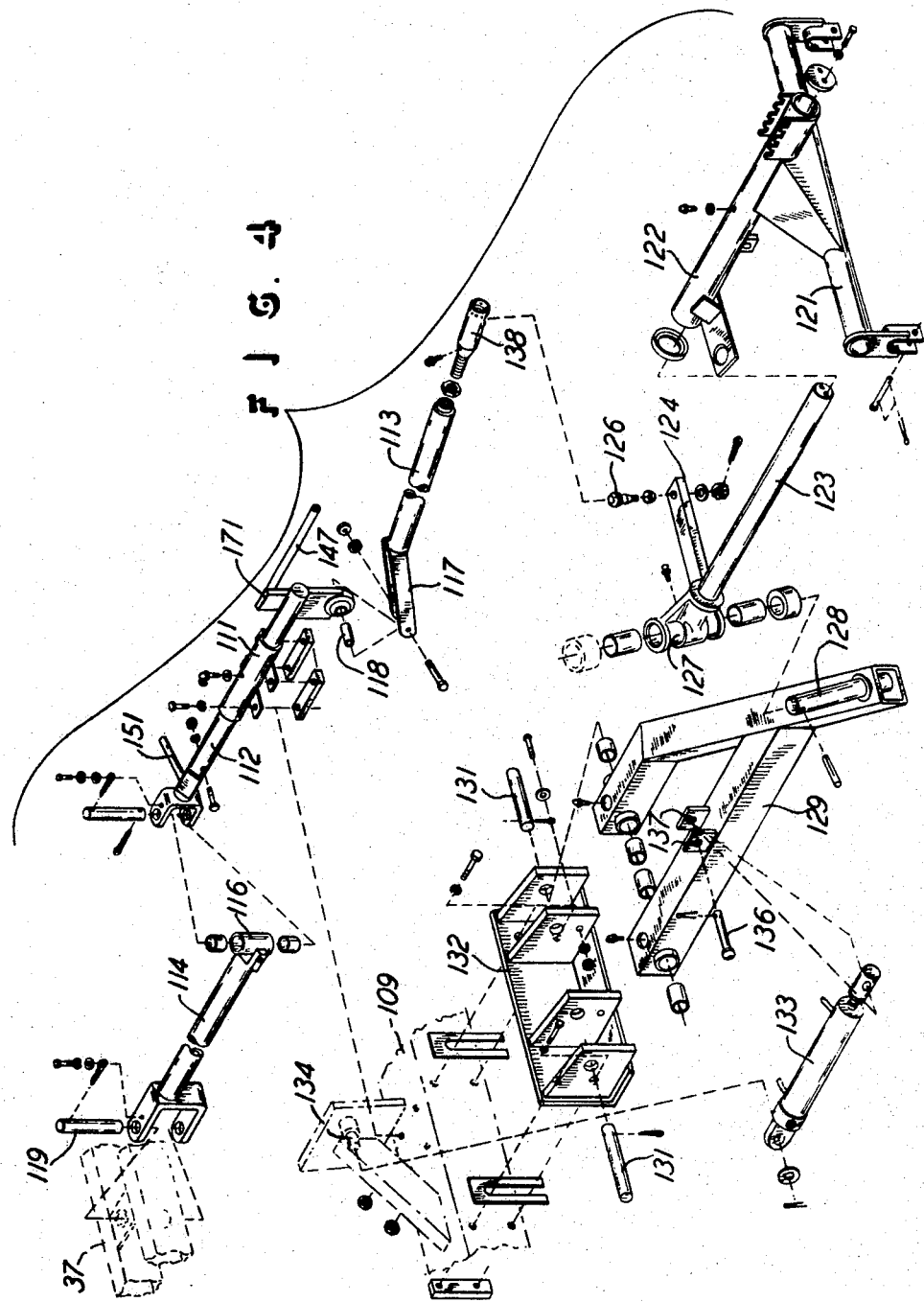

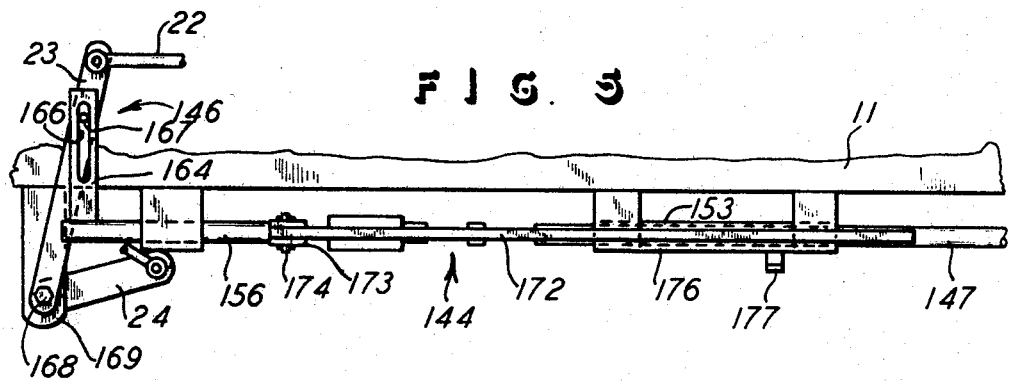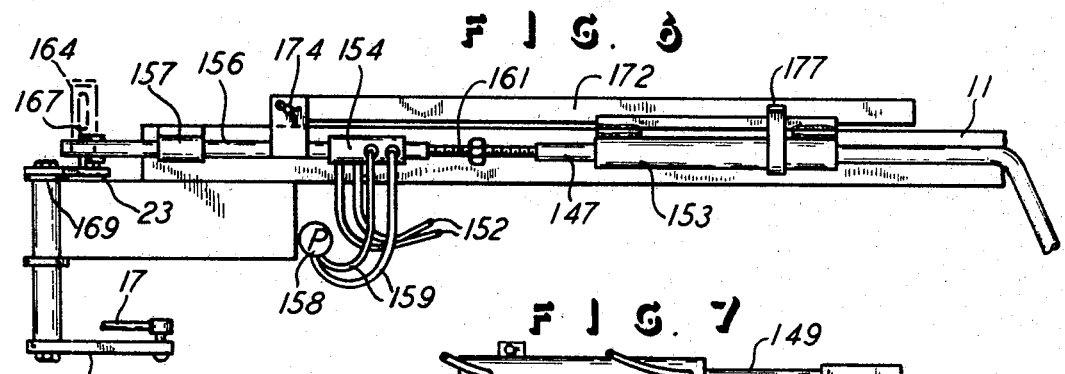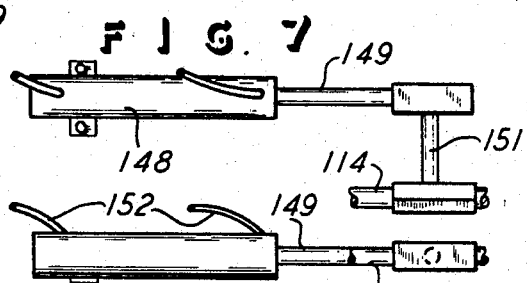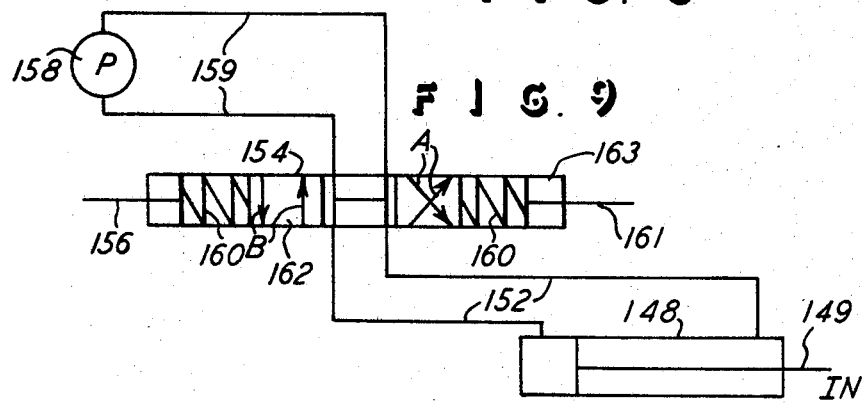

United States Patent Office 3,472,005
Patented Oct. 14, 1969

3,472,005
ARTICULARLY MOUNTED GANG MOWERS
ON A TRACTOR
Leonardo C. Profenna, Racine, Wis., assignor to Jacobsen
Manufacturing Company, Racine, Wis., a corporation
of Wisconsin
Filed Nov. 21, 1966, Ser. No. 595,759
Int. Cl. A01d 75/30
U.S. Cl. 56—7                                13 Claims

ABSTRACT OF THE DISCLOSURE

A plurality of lawn mowers are articularly mounted on a tractor to be movable relative to the tractor in both the horizontal and vertical plane. Thus the mowers can be steered along the ground so that they have the same turning center as that of the tractor, and the mowers can be raised off the ground and supported in a transport position. A control is provided, and is interconnected with the ground-traction control of the mowers, for the purpose of pivoting the mowers about a vertical axis for the steering function mentioned. This control may be connected to the steering mechanism of the tractor itself, so that, when the tractor wheels are turned, the mower steering control is operated to steer the mowers in accordance with the tractor steering. Further, when the mowers are raised to the transport position, alignment means align them in a position transverse to the fore-and-aft direction of the tractor.

BACKGROUND OF THE INVENTION

Heretofore mowers have been articularly mounted on a tractor and were steerable relative to the tractor by ground traction. Such steering is not sensitive under all conditions and forms of terrain, and under certain conditions of the mowers themselves. This invention adds separately operated means for steering the mowers. Such means is preferably connected to the steering mechanism of the tractor. Still further, heretofore, two separate groups of mowers were provided, and one group was disposed in a tracking position relative to the tractor so that it steered in accordance with the steering of the tractor, and the two groups of mowers were connected together such that the one group imparts its steering motion to the other group. In this invention, the mowers can be raised for transport at which time they are automatically aligned relative to the tractor. The described means for steering the mowers separate from the ground-traction steering is a hydraulic system including a pump, valve, and cylinder.

FIG. 1 is a diagrammatic top plan view of this invention.

FIG. 2 is a rear exploded view of certain parts shown in FIG. 1, with parts added thereto, and with parts shown by dotted lines, and with dotted lines showing how the parts are assembled together.

FIG. 3 is a rear exploded view of additional certain parts shown in FIG. 1, and with parts added thereto.

FIG. 4 is a front exploded view of certain parts in FIG. 1, and with other parts added thereto.

FIG. 5 is a top plan view of a fragment of FIG. 1, with parts added thereto.

FIG. 6 is a side elevational view of FIG. 5.

FIG. 7 is a top plan view of certain parts in FIG. 1, with parts added thereto.

FIG. 8 is a side elevational view of FIG. 7.

FIG. 9 is a schematic view of a hydraulic system employed in this invention.

A tractor 10 is shown to include a frame 11, two front wheels 12, and four rear wheels 13. The front wheels 12 are controlled by the usual steering wheel 14 which connects to steering mechanism 16 which in turn connects to steering links 17, 18, 19, and 21. The connection from the box 16 to the linkage 17 is through an arm 22, a plate 23 pivotally connected to the arm 22, and an arm 24 suitably connected with the plate 23 to pivot therewith. The arm 24 is pivotally connected to the link 17. This linkage connection may of course be conventional, and it need not be further shown or described for comprehension of this invention by one skilled in the art.

The mowers are shown diagrammatically in FIG. 1, and they are indicated to be reel type mowers, and they have ground-engaging wheels 26. One group of mowers includes the two forwardly located mowers 27 and 28 which are arranged side-by-side and are axially aligned transverse to the forward direction of the tractor 10. Another group of mowers includes the mowers 29 and 31 which are substantially aligned on the vertical plane of the axis of the tractor rear wheels 13. Such alignment is significant in that these mowers 29 and 31 need not be steered relative to the tractor 10 since they will always have the turning center of the tractor rear wheels 13. The last group of mowers consists of the mowers 32, 33, and 34, and this group is in a trailing position with respect to the tractor 10. They are shown to be pivotally connected to the tractor 10 about a vertically disposed pivot member 36 which presents the vertical pivot axis for the trailing mowers. Thus, these trailing mowers will automatically steer upon turning the tractor, and they will therefore align their axes on the turning center of the tractor. Thus, if the tractor front wheels 12 are turned to move the tractor to the left, as viewed in FIG. 1, then, upon forward movement of the tractor 10 toward the left, the mower 34 will trail to a position where the three mowers 32, 33, and 34 have their aligned axis directed at the turning center of the tractor 10, and this means the mower 32 is forward from the position shown in FIG. 1, while the mower 34 is rearward from its position.

FIGS. 1, 2, and 3, show that the rear group of mowers 32, 33, and 34 are articularly mounted with respect to the tractor by means of a carrier and hitch assembly 37. The assembly 37 is pivotally connected to the tractor 10 for both horizontal and vertical pivotal movement. This is accomplished by the assembly including a sleeve 38 which receives the pivot pin 36 for the steering or horizontal pivoting of the assembly 37 and the three mowers 32, 33, and 34. Also, the tractor 10 has two rearwardly extending plates 39 suitably connected to the frame 11, as shown in FIG. 2 for instance, and the plates 39 support a pivot pin 41. A box-shaped bracket 42 has two openings, such as the shown opening 43, and these openings 43 receive the ends of the pin 41 so that the bracket 42 is pivotal in a vertical direction. Also, the bracket 42 has two openings 44 which receive the ends of the pivot pin 36 for the horizontal pivotal movement of the assembly 37.

Two arms, such as the shown arm 46, may be utilized to pivotally connect at one end to a pin 47 secured in the plates 39. The other ends of the arms 46 are provided with slots, such as the shown slot 48, and these slots 48 receive the end of a pin 49 mounted in the bracket 42. Thus the bracket 42 is permitted lost motion, which is a limited vertical pivotal motion about the pin 41 to the limit of the slot or slots 48. This of course provides for up and down movement of the rear mowers for adjusting to the ground contour. Further, the pin 49 may be removed for additional up and down pivotal movement of the mowers in the mowing position.

Of course the dotted line between the parts described in FIG. 2, as well as other parts of the drawing, indicate the assembly of the parts, all in a conventionl manner of an exploded type of drawing which is shown.

The center rear mower 33 has its frame 51 shown in FIG. 2, and this mower is therefore pivotal about the shaft 52 which is affixed to an arm 53 vertically pivotally mounted on the assembly 37 through a pin 54 affixed to the arm 53. A hydraulic cylinder 56 is used for raising and lowering the mower 33, and the cylinder is mounted on the pin 57, at one of the cylinder 56, and the cylinder has an end block 58 which engages a pin 59 secured to arms 61 on the arm 53. Thus, extension and contraction of the cylinder 56 displaces the pin 59 and likewise pivots the arm 53 about the shaft 54, for raising and lowering the mower 33. The cylinder 56 is shown to have hydraulic hose connections 62 which are only fragmentarily shown but would of course extend to a suitable valve and pump for conventional connections and control mechanisms (not shown).

The rear side mowers 32 and 34 are also vertically pivotally mounted on the assembly 37, and this is shown in FIG. 3 where the frame 63 of the mower 32 is shown. A pivot pin 67 is mounted on the assembly 37, and a sleeve 68 in an arm 66 receives the pin 67 for the pivotal mounting mentioned. Here also a hydraulic cylinder 69 is mounted on a pin 71 secured in plates 72 on the assembly 37. The other end of the cylinder 69 attaches to a pin 74 on plates 73 which are affixed to the arm 66, for pivoting the arm 66 up and down and thereby raising and lowering the mower 32, all under conventional and desired control means.

Of course in both instances of mowers 32 and 33, as well as mower 34, the respective pivot shafts 52 and 64, for the mower frames 51 and 63, are received in respective sleeves 76 and 77, as indicated by the dotted lines showing the assembly. Further, the necessary bushings, plates, nuts, bolts, cotterpins, and the like are shown as explicit detail for completing certain assemblies in connection with the parts described. However they are not further referred to since they are no direct part of this invention.

Affixed to the sleeve 77 is a plate 78 which has its upper surface 79 engage the camming surface 81 of a plate 82 included in the assembly 37. This engagement is made when the mowers 32 and 34 are raised, there is a similar plate 78 and another plate 82 for the mower 34. The plates 78 cause the outboard mowers 32 and 34 to fold so that their axes are vertical when they are in the transport position, and the entire assembly therefore occupies only a minimum width, as desired. To assure that the rear mowers maintain firm contact with the ground for desired traction, a compression spring 83 is centered on a pressure bar 84 which in turn is connected to the arm 53 by the pin 86 on the arm 53. A pin 85 extends through the bar 84 and abuts the lower end of the spring 83. The other end of the pressure bar 84 has a slot 87 which receives a pin 88 on an arm 89 pivotally mounted on the pin 67, as indicated. Thus the spring 83 will bear downwardly on the center mower arm 53, as desired. Also, FIG. 2 shows a tension spring 91 which is connected between an extension affixed to the arm 53 and the arm 93, the latter being comparable to the arm 66 for the opposite mower 32. Thus the mower 34 is of course pivotally mounted on the assembly 37 by means of its arm 93 pivotally mounted on the pin 94.

Thus, when either or both of the outboard mowers 32 and 34 is raised, it is desired that the one mower 33 have adequate traction for the steering function, particularly since now only this one mower will also steer the forward mowers 27 and 28, in a manner hereinafter described. Thus, FIG. 3 indicates that the raising of the arm 66 will cause its attached pin 96 to engage the upstanding arm 89 and thereby bear downwardly on the spring 83, through the pin 88, to urge downwardly on the center mower arm 53 for the desired ground pressure. Likewise, raising of the mower 34 will cause its frame 93 to pull on the tension spring 91 and again bear downwardly on the arm 53, for the desired ground traction of the center mower 33.

Also, the cylinder 56 has a slot 97 for lost motion reception of the pin 59 which is received in the slot 97. Thus, when the cylinder 56 is extended for raising the arm 53, the spring 83 becomes effective for further pivoting the arm 53 to the final and maximum upwardly pivoted position for transport, as the spring 83 moves over center with respect to the line between pins 88 and 54.

To accomplish alignment of the mowers in the transport position, a rock plate 98 is secured to the shaft 54 by means of a key 99. The plate 98 therefore rotates with the rotation of the shaft 54, which is rotated upon raising and lowering of the center mower 33. Plate 98 has pivotally connected thereto two rods 101 and 102 which extend in a direction parallel to the plane of movement of the plate 98. Rods 101 and 102 have threaded ends 103, and nuts 104 are adjustably disposed on the ends 103. The bracket 42 has two slots 106 which have the threaded ends 103 projecting therethrough. It will be noted that the rod 102 shows that its nuts 104 are on the inside of the box-shaped bracket 102, while the rod 101 has its nuts 104 on the outside of the bracket 42.

With this arrangement, when the center mower 33 is raised, the shaft 54 is rotated, and it likewise rotates the plate 98 to axially displace the rods 101 and 102, but in opposite directions. Since the rods 101 and 102 are engaged with the bracket 42, through the nuts 104, they exert a force on the assembly 37 through the plate 98 to align the assembly 37 across the rear of the tractor 10. For instance, if the tractor and mowers were in the left turn position previously described, the right end of the assembly 37, as viewed in FIG. 2, would be disposed further to the rear than its left end would be. The slots 106 readily permit the rods 101 and 102 to accommodate this turned or pivotal position of the assembly 37 about its vertical pivot pin 36. Then, when the rear mowers are raised from this turned position, the rotation of plate 98 will cause the rod 102 to pull on the assembly 37 through the plate 98, and thereby bring the assembly 37 and its attached mowers into desired alignment. Conversely, if the units were in a right turn then the right hand end of assembly 37 would be forward, as viewed in FIG. 2. Then, upon raising the mowers from that position, the lower rod 101 would push on the assembly 37 through the plate 98 and thereby align the rear mowers, as desired, for the transport position.

FIGS. 1 and 4 show that the rear mowers are connected to the front mowers 27 and 28 through linkages generally designated 107 and 108. Thus any turning of the rear mowers is imparted to the front mowers, and the latter likewise are therefore steered and controlled.

Thus the tractor 10 has the frame pieces 109 which stationarily support sleeves 111 through which the linkages 107 and 108 are axially slidable to move in the fore-and-aft direction of the tractor 10. The linkages include the intermediate pieces 112 and the forwardly disposed pieces 113 and the rearwardly disposed pieces 114. The pieces 113 and 114 are connected to the intermediate piece 112 by means of universal joints 116, connecting the piece 114, and a clevis 117 and pin 118, connecting the piece 113. The piece 114 is pivotally connected to the assembly 37 by the pivot pin 119. The front mowers 27 and 28 have their frames 121 attached to sleeves 122 which receive shafts 123. The shafts 123 have laterally extending arms 124 connected therewith, and these arms 124 pivotally connect to the front ends of the pieces 113, by means of the studs 126. The shafts 123 also have vertically disposed sleeves 127 which receive pins 128 on the front end of the mower support frames 129. Two pivot pins 131 for each frame 129 vertically pivotally support the frames 129 on brackets 132 which are suitably bolted to the tractor frame piece 109. A hydraulic cylinder 133 is connected between the tractor frame pin 134 and the mower frame pin 136, which is mounted in the plates 137 on the frame 129. Thus, extension and contraction of the cylinder 133 will cause the vertical pivotal movement of the frame 129, and consequently the mowers 27 and 28 will be raised and lowered, as desired.

It will therefore be appreciated that any steering of the rear mowers 32, 33, and 34 will be transferred to the front mowers 27 and 28 through the linkages 107 and 108, respectively. Likewise, when the rear mowers are raised to the transport position, and if both the front and rear mowers were in a turn at the time that the raising was commenced, the rear mowers would align as previously described. This alignment action would also be transferred to the front mowers 27 and 28, through the linkages 107 and 108, as desired. Further, FIG. 4 shows that the forward end 138 of the piece 113 is threaded to provide for adjustable extension and contraction of the overall length of the piece 113, and thereby control the initial steering or alignment of the mowers 27 and 28.

FIG. 1 shows the mounting of mowers 29 and 31 to be on tractor frame arms 139 which pivotally receive the mower arms 141 and pivot pins 142. Hydraulic cylinders 143 are connected between the tractor frame and the mower arm 141, and the cylinder is therefore available for pivoting the mowers 29 and 31 between the lowered and raised positions. Since the mowers 29 and 31 are at least approximately aligned with the tractor rear wheels 13, there need be no provision for steering the mowers in accordance with the steering of the tractor, other than of course the rigid or fixed position that they maintain with respect to the tractor, and this position of course automatically retains them in a steered relationship to the tractor so that they turn about the turning center which the tractor has, such turning center is at least approximately aligned with the axis of the tractor rear wheels.

FIGS. 5 through 9 show steering means, generally designated 144, mounted on one side of the tractor 10, and operatively connected between the mowers and the tractor for steering the mowers relative to the tractor. This steering means 144 includes a steering control, generally designated 146, and which is herein shown to be connected to the tractor steering wheel 14. A rod 147 is operatively connected to the steering means 144 which includes a double acting hydraulic cylinder 148 suitably bolted to the tractor frame piece 109. The cylinder has its ram 149 extending rearwardly and connected to the linkage piece 114 by means of a cross rod 151. Thus a direct connection is made between the cylinder rod 149 and the piece 114 so that axial movement of either one will be directly transferred to the other. Thus extension and contraction of the cylinder rod 149, by the usual control of hydraulic pressure through the cylinder hoses 152, will axially displace the piece 112 and thereby turn the assembly 37 and its attached rear mowers. Of course the front mowers 27 and 28 are thus likewise turned, or steered.

The front end of the rod 147 is shown to be slidable in a sleeve 153 which is secured to the tractor frame 11. The forward end of the rod 147 is shown to be threaded, and it is therefore axially adjustably related to a hydraulic valve 154 which in turn has a rod 156 extending forwardly therefrom. The arrangement is such that any axial movement of the rod 156, which is slidably supported in a sleeve 157 attached to the tractor frame 11, will be effective to actuate the valve 154.

FIGS. 6 and 9 diagrammatically show a hydraulic pump 158 connected to the valve 154 by hydraulic lines 159. The hydraulic cylinders lines 152 are also shown, and it will therefore be understood that the tractor will power the pump 158, and control of the valve 154 will provide the desired steering of the mowers. For instance, adjustment of the valve 154 to a position which will cause fluid pressure to enter the cylinder 148 and extend the ram 149 will cause the assembly 37 to turn to the left. Conversely, contraction of the cylinder 148 by reverse movement of the valve 154, will cause the assembly 37 to turn to the right, both as viewed in FIG. 1.

It will be further noted that the valve 154 is connected to the threaded end 161 of the rod 147. Also, as previously mentioned, the rod 156 extends into the valve 154, and it displaces the spool, as shown at 162 in FIG. 9, within the valve 154. Compression springs 160 are shown on opposite sides of the spool 162. The rod 147 can be considered to be connected to the valve housing, designated 163 in FIG. 9. The arrows A and B show the hydraulic passageways through the spool and between the lines 159 and 152 when the spool is moved rearwardly, and forwardly, respectively. The valve is so arranged and connected to permit it to be influenced by the position of the assembly 37. That is, when the assembly 37 is steered by ground traction, it axially displaces the rod 147 and thereby displaces the valve housing 163. This is therefore in the nature of a feedback connection which permits the desired accuracy in the functioning of the valve 154. This is significant with regard to the connection of the rod 156 with the steering mechanism of the tractor 10. Thus, it will be noted that the rod 156 has an arm 164 with a slot 166. A pin 167 is disposed on the link 23, and thus the pivotal movement of the link 23 about its pivot bolt 168 on the tractor frame bracket 169 will displace the pin 167 and consequently axially displace the rod 156. This action controls the valve 154 for fluid control in the cylinder 148, as mentioned. So, the steering control includes the rod 156, arms 164, and 23, the tractor steering linkage and mechanism, and the valve 154, in this particular embodiment.

Therefore, if a turn were made, for example to the left, it would be desired to have the rear assembly 37 move forwardly on its left side, as viewed in FIG. 1 so that it would maintain the turning center which is occupied by the tractor. This means that the arm 23 pivoted forwardly, and the rod 156 also moved forwardly, having the valve spool 162 move forwardly to cause the cylinder 148 to contract. This pivots the assembly 37 forwardly at its left end, and the rod 147 is connected to the piece 112, in FIG. 4, through a plate 171, so the valve 154 is axially repositioned forwardly along the side of the tractor 10, and this as desired in the so-called feedback system which accurately governs the degree of turn of the mowers by regulating the action of the valve 154 in accordance with the degree of turn of the tractor front wheels 12. The valve has then returned to its shown center positioning and it is an open-center valve.

FIG. 4 shows the connection of the rod 147 at its rear end with the piece 112, as the plate 171 is welded or otherwise secured to the piece 112, and the rod 147 is connected to the plate 171 so that movement of the piece 112 will produce similar movement in the rod 147, for the purpose described. Likewise, FIG. 4 shows the connection of the cross piece 151 with the piece 112, for the connection of the cylinder 148 with the piece 112.

FIGS. 5 and 6 show a handle 172 connected to the rod 156 by means of plates 173 and a pivot pin 174. Thus the handle is extended along the side of the tractor 10, and is therefore readily accessible to the operator. He can pick up the handle 172 and pivot it slightly about the pin 174 and then rotate the assembly about the axis of the rod 156. This action removes the arm 164 from its sliding connection with the control pin 167. Thus the steering of the mowers is disconnected from the steering of the tractor 10. An angle plate 176 is connected to the tractor frame 10 for supporting the lever handle 172 in the position shown in FIGS. 5 and 6. Of course the handle 176 is free to move along its longitudinal axis as it slides in accordance with the axial movement of the rod 156. Also, a retainer 177 is attached to the tractor frame and extends slightly outwardly from the member 176, and this retainer 177 is thus available for supporting the handle 172 when the handle has been rotated to the position to disconnect the arm 164 from the pin 167. This position of disconnect is shown in dot-dash lines with regard to the arm 164 in FIG. 6.

Of particular importance with regard to this power steering or hydraulic control of the mowers is at the time the entire unit is moving diagonally down a hill. At that time the mowers are not fully responsive to ground traction, so the power steering described is useful, and at this and other times it aids ground-traction steering. The entire steering arrangement is such that the tractor front wheels 12 turn about a turning center which is at least approximately on the axis of the tractor rear wheels 13. Of course both tractor front wheels 12 have this same turning center, so their respective turning radii are of different lengths, as is commonly known. Likewise, the rear group of mowers on assembly 37 align with the turning center of the tractor front wheels, and the front mowers 27 and 28 also aligned with this same turning center, so the mowers also have different lengths of turning radii. Thus the tractor and all the mowers turn about the same turning center in a given degree of turn, and this is a feature of the steering means disclosed.

While a specific embodiment of this invention has been shown and described, it should be obvious that certain changes could be made in the embodiment and the invention should therefore be determined only by the scope of the appended claims.

What is claimed is:

1. Articularly mounted gang mowers on a tractor having steerable ground wheels and steering mechanism and including a steering wheel and steering linkage operatively connected to said ground wheels for steering said ground wheels, first means for articularly mounting said mowers on said tractor on a horizontal pivot axis for raising and lowering said mowers completely off the ground and with respect to said tractor, second means for articularly mounting said mowers on said tractor about a vertical pivot axis for steering of said mowers along the ground upon forward movement of said tractor and relative thereto and in response to ground traction of said mowers, and power lift means connected between said tractor and said mowers for the raising of said mowers completely off the ground, wherein the improvement comprises a manually controllable steering means operatively interconnected between said second means and said tractor for steering said mowers along the ground and relative to said tractor and in addition to said ground traction steering of said mowers, and a steering control included in said steering means and being movable by the operator for desired steering of said mowers.

2. The subject matter of claim 1, wherein said steering means is operatively connected to said steering mechanism of said tractor and is movable with the steering movement of said steering mechanism, and is operatively connected to said mowers, all for impressing upon said mowers the steering movement of said steering mechanism and for steering said mowers in accordance with the steering of said tractor.

3. The subject matter of claim 1, wherein said steering control is operatively connected to said steering wheel of said tractor and is movable in direct relation to the steering movement of said steering wheel for disposing said mowers in alignment with the turning center of said tractor.

4. The subject matter of claim 1, wherein said mowers include one group in side-by-side relation for mowing in the forward direction of movement of said tractor and with said one group being articularly connected to said tractor to be in trailing relation to said tractor for steered tracking movement along the ground in accordance with the steered direction of tractor movement, and said steering means being operatively connected to said one group for additional steering of said mowers along the ground.

5. The subject matter of claim 4, wherein said mowers include a second group in side-by-side relation for mowing in the forward direction of movement of said tractor and with said second group being articularly connected to said tractor for steering movement with respect thereto, and said one group and said second group being connected together for unified steering of the two said groups in accordance with the steered tracking movement of said one group.

6. The subject matter of claim 1, wherein said mowers include one group in side-by-side relation for mowing in the forward direction of movement of said tractor, a hitch bracket connected to said one group and including means which provides said vertical pivot axis of said one group and with said bracket being vertically pivotally connected to said tractor on said horizontal pivot axis, and a slotted brace pivotally connected between said tractor and said one group in a lost motion connection for limited vertical pivot of said one group relative to said tractor.

7. The subject matter of claim 6, including a pin operatively interconnecting said brace to said bracket, and with said pin being removable for unlimited pivotal movement of said bracket.

8. The subject matter of claim 1, wherein said steering means includes a hydraulically operated cylinder, valve, and pump, all hydraulically connected together.

9. The subject matter of claim 8, and with said valve being of the type for free passage of hydraulic fluid when in one position, and with said steering means further including linkage operatively connected to said mowers and also to said valve for providing a feedback to said valve according to the steering of said mowers and thereby positioning said valve in said one position.

10. The subject matter of claim 3, wherein said steering means includes a hydraulically operated cylinder, valve, and pump, all hydraulically connected together.

11. The subject matter of claim 3, including means interconnected between said steering control and said steering wheel for selectively operatively connecting and disconnecting said steering control from said steering wheel.

12. Articularly mounted gang mowers on a tractor having steerable ground wheels and steering mechanism, including a steering wheel and steering linkage operatively connected to said ground wheels for steering said ground wheels, said mowers being articularly mounted on said tractor on a horizontal pivot axis for raising and lowering said mowers with respect to said tractor and about a vertical pivot axis for steering said mowers along the ground upon forward movement of said tractor and relative thereto, and power lift means connected between said tractor and said mowers for the raising and lowering of said mowers wherein the improvement comprises one group of mowers included in said mowers and disposed in side-by-side relation for mowing in the forward direction of movement of said tractor and to be in trailing relation to said tractor for steering tracking movement along the ground in accordance with the steered direction of tractor movement, and means operatively connected to said one group and movable in response to the raising of said one group of mowers for transport, and alignment members operatively connected between said tractor and said means for swinging said one group of mowers about its vertical pivot axis to align said mowers with said tractor.

13. The subject matter of claim 12, wherein said mowers also include a second group of mowers, and connection members connected between said second group and said one group for ground steering and transport aligning said second group through said one group and therewith.

References Cited

UNITED STATES PATENTS

| | | | |
|---|---|---|---|
| 1,726,660 | 9/1929 | Ferguson | 56—7 |
| 2,067,158 | 1/1957 | Moyer | 56—7 |
| 2,099,902 | 11/1937 | Moyer et al. | 56—7 |
| 2,659,190 | 11/1953 | Imbt | 56—7 |
| 2,672,000 | 3/1954 | Speiser | 56—7 |
| 3,106,811 | 10/1963 | Heth et al. | 56—7 |

F. BARRY SHAY, Primary Examiner

PASQUALE A. RAZZANO, Assistant Examiner